United States Patent
Tsai

(10) Patent No.: US 12,519,512 B2
(45) Date of Patent: Jan. 6, 2026

(54) SUPPORT OF HIERARCHICAL/ADJUSTABLE CODEBOOK STRUCTURE FOR DL AND UL DEVICE COLLABORATION

(71) Applicant: MEDIATEK INC., Hsinchu (TW)

(72) Inventor: Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 345 days.

(21) Appl. No.: 18/229,254

(22) Filed: Aug. 2, 2023

(65) Prior Publication Data
US 2024/0080070 A1 Mar. 7, 2024

Related U.S. Application Data

(60) Provisional application No. 63/374,260, filed on Sep. 1, 2022.

(51) Int. Cl.
*H04B 7/0413* (2017.01)
*H04B 7/0456* (2017.01)
*H04B 7/06* (2006.01)

(52) U.S. Cl.
CPC ......... *H04B 7/0456* (2013.01); *H04B 7/0626* (2013.01)

(58) Field of Classification Search
CPC .... H04B 7/0456; H04B 7/046; H04B 7/0465; H04B 7/0469; H04B 7/0473; H04B 7/0478; H04B 7/0479; H04B 7/048; H04B 7/0481; H04B 7/0482; H04B 7/0486; H04B 7/0487; H04B 7/0626; H04B 7/0639; H04L 25/03898; H04L 25/03904; H04L 25/0391; H04L 25/03917; H04L 25/03923; H04L 25/03929; H04L 25/03936; H04L 25/03942

See application file for complete search history.

(56) References Cited

U.S. PATENT DOCUMENTS

| | | | | |
|---|---|---|---|---|
| 11,984,958 | B2 * | 5/2024 | Huang | H04B 7/0639 |
| 2019/0174483 | A1 * | 6/2019 | Tsai | H04W 72/0446 |
| 2019/0222282 | A1 * | 7/2019 | Tsai | H04W 72/566 |
| 2019/0393979 | A1 * | 12/2019 | Tsai | H04L 1/0026 |
| 2021/0091839 | A1 * | 3/2021 | Tsai | H04W 72/21 |
| 2022/0190897 | A1 * | 6/2022 | Rahman | H04B 7/0626 |
| 2022/0200666 | A1 * | 6/2022 | Lee | H04B 7/024 |
| 2022/0407745 | A1 * | 12/2022 | Lo | H04W 24/02 |

(Continued)

*Primary Examiner* — Frank Duong
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE transmits a capability report to a base station. The capability report indicates one or more capabilities of an aggregated mobile terminal (MT) formed by the UE and one or more devices each being a component device. The UE receives configurations of an initial set of reference signals from the base station. The configurations respond to the one or more capabilities. The UE transmits an initial report to the base station. The initial report indicates codebook parameters. The UE receives codebook configurations of a codebook from the base station. The codebook is for generating a downlink precoder matrix for CSI reporting or for generating an uplink precoder matrix for uplink transmission.

20 Claims, 10 Drawing Sheets

(56) References Cited

U.S. PATENT DOCUMENTS

| | | | |
|---|---|---|---|
| 2023/0111205 A1* | 4/2023 | Tsai | H04J 11/0053 370/252 |
| 2023/0113144 A1* | 4/2023 | Tsai | H04W 72/0453 370/329 |
| 2023/0113173 A1* | 4/2023 | Tsai | H04W 72/02 370/329 |

* cited by examiner

SUPPORT OF HIERARCHICAL/ADJUSTABLE CODEBOOK STRUCTURE FOR DL AND UL DEVICE COLLABORATION

CROSS-REFERENCE TO RELATED APPLICATION(S)

This application claims the benefits of U.S. Provisional Application Ser. No. 63/374,260, entitled "CSI framework for device formed by aggregated components" and filed on Sep. 1, 2022, which is expressly incorporated by reference herein in their entirety.

BACKGROUND

Field

The present disclosure relates generally to communication systems, and more particularly, to techniques of determining codebooks for distributed multiple-input multiple-output (MIMO) transmitters/receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE transmits a capability report to a base station. The capability report indicates one or more capabilities of an aggregated mobile terminal (MT) formed by the UE and one or more devices each being a component device. The UE receives configurations of an initial set of reference signals from the base station. The configurations respond to the one or more capabilities. The UE transmits an initial report to the base station. The initial report indicates codebook parameters. The UE receives codebook configurations of a codebook from the base station. The codebook is for generating a downlink precoder matrix for CSI reporting or for generating an uplink precoder matrix for uplink transmission.

In an aspect of the disclosure, a method, a computer-readable medium, and an apparatus are provided. The apparatus may be a base station. The base station receives a capability report from a user equipment (UE). The capability report indicates one or more capabilities of an aggregated mobile terminal (MT). The aggregated MT is formed by the UE and one or more repeaters each being a component MT. The base station configures an initial set of reference signals for the UE based on the one or more capabilities. The base station transmits the initial set of reference signals to the UE. The base station receives an initial report from the UE. The initial report indicates codebook parameters. The base station determines a codebook. The codebook is either initiated or updated according to the codebook parameters. The base station configures the codebook for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
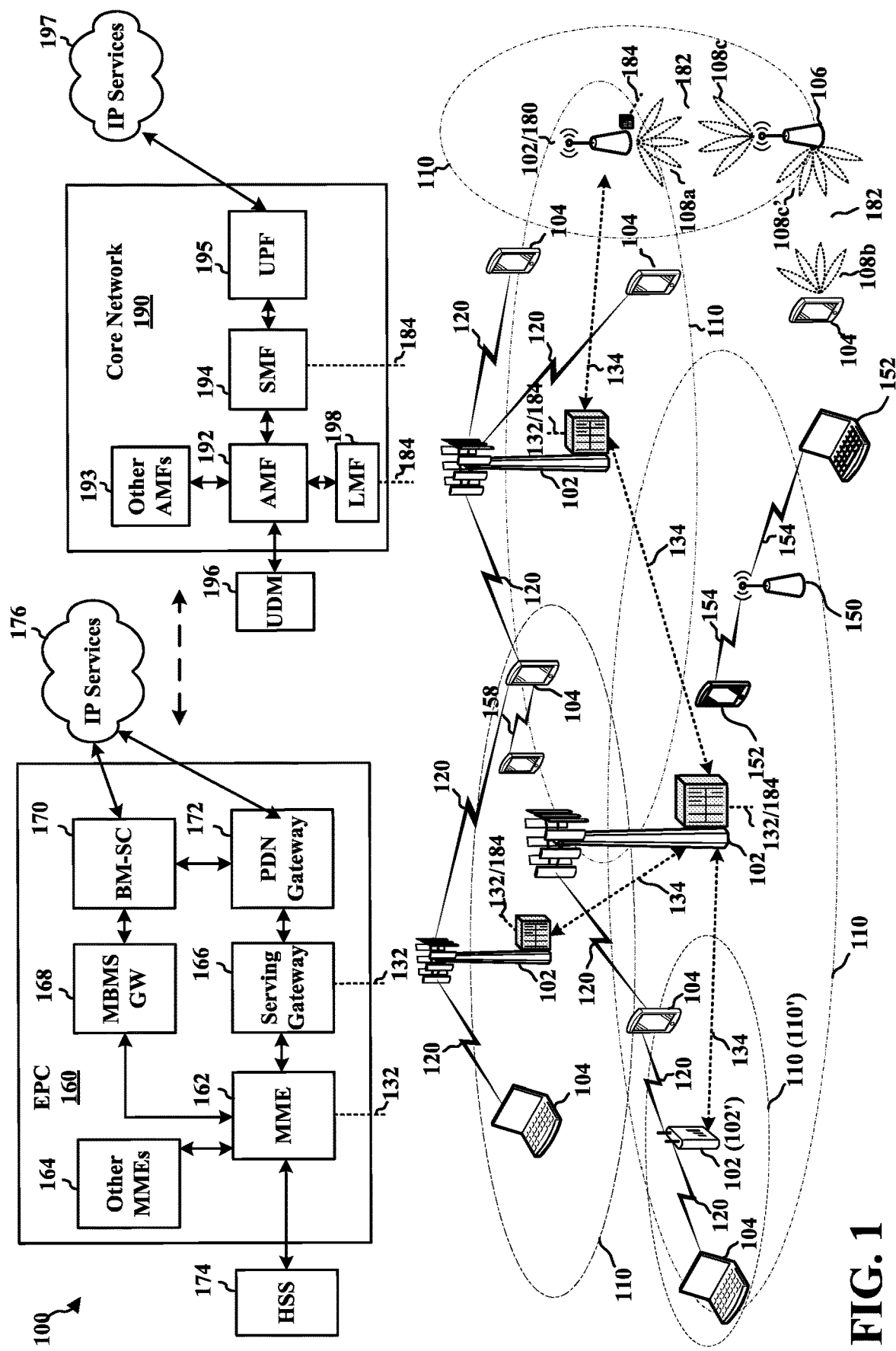
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
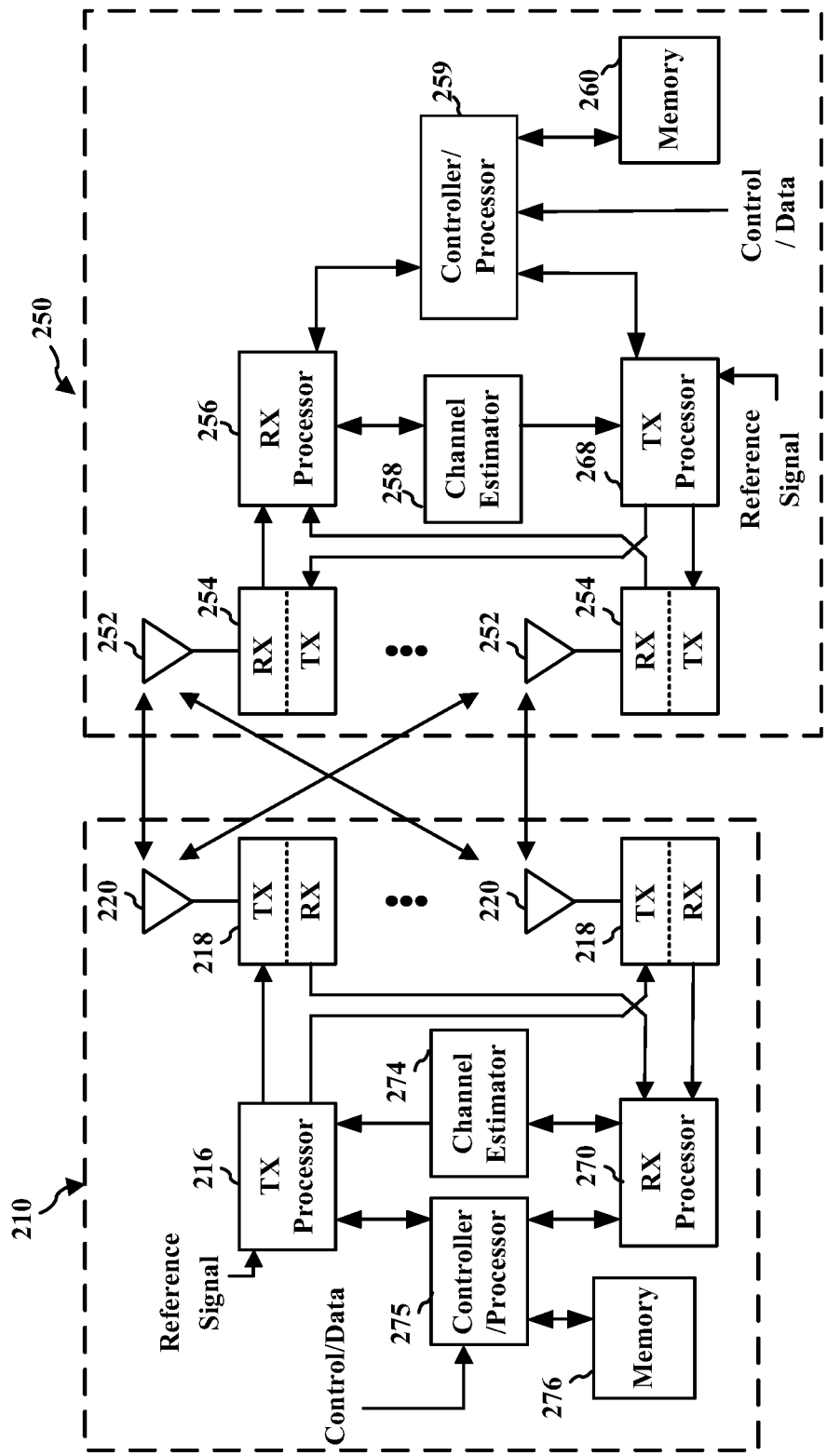
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218 TX. Each transmitter 218 TX may modulate an RF carrier with a respective spatial stream for transmission.

At the UE 250, each receiver 254 RX receives a signal through its respective antenna 252. Each receiver 254 RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254 TX. Each transmitter 254 TX may modulate an RF carrier with a respective spatial stream for transmission. The UL transmission is processed at the base station 210 in a manner similar to that described in connection with the receiver function at the UE 250. Each receiver 218 RX receives a signal through its respective antenna 220. Each receiver 218 RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier spacing (SCS) of 60 kHz over a 0.25 ms duration or a SCS of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
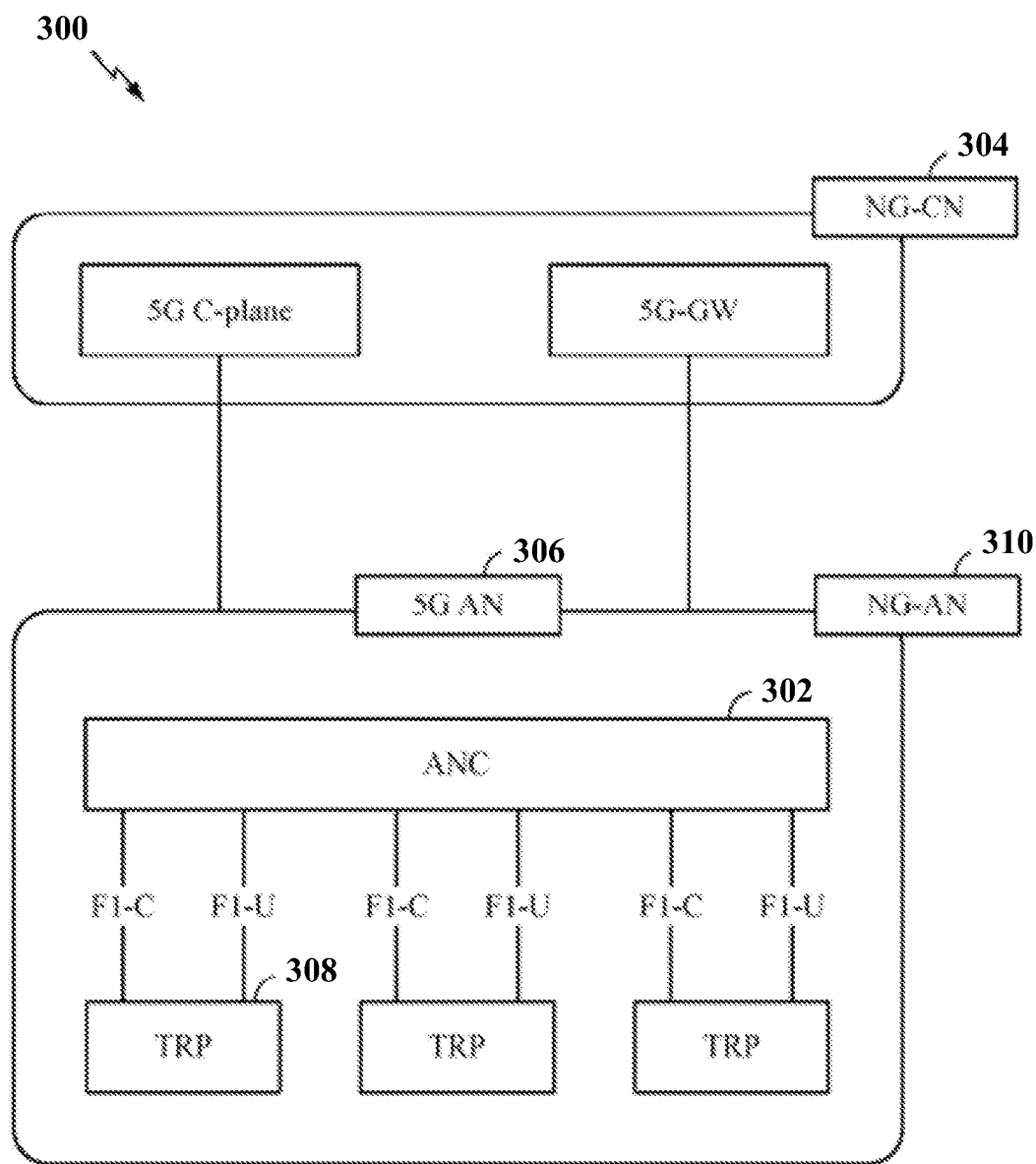
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
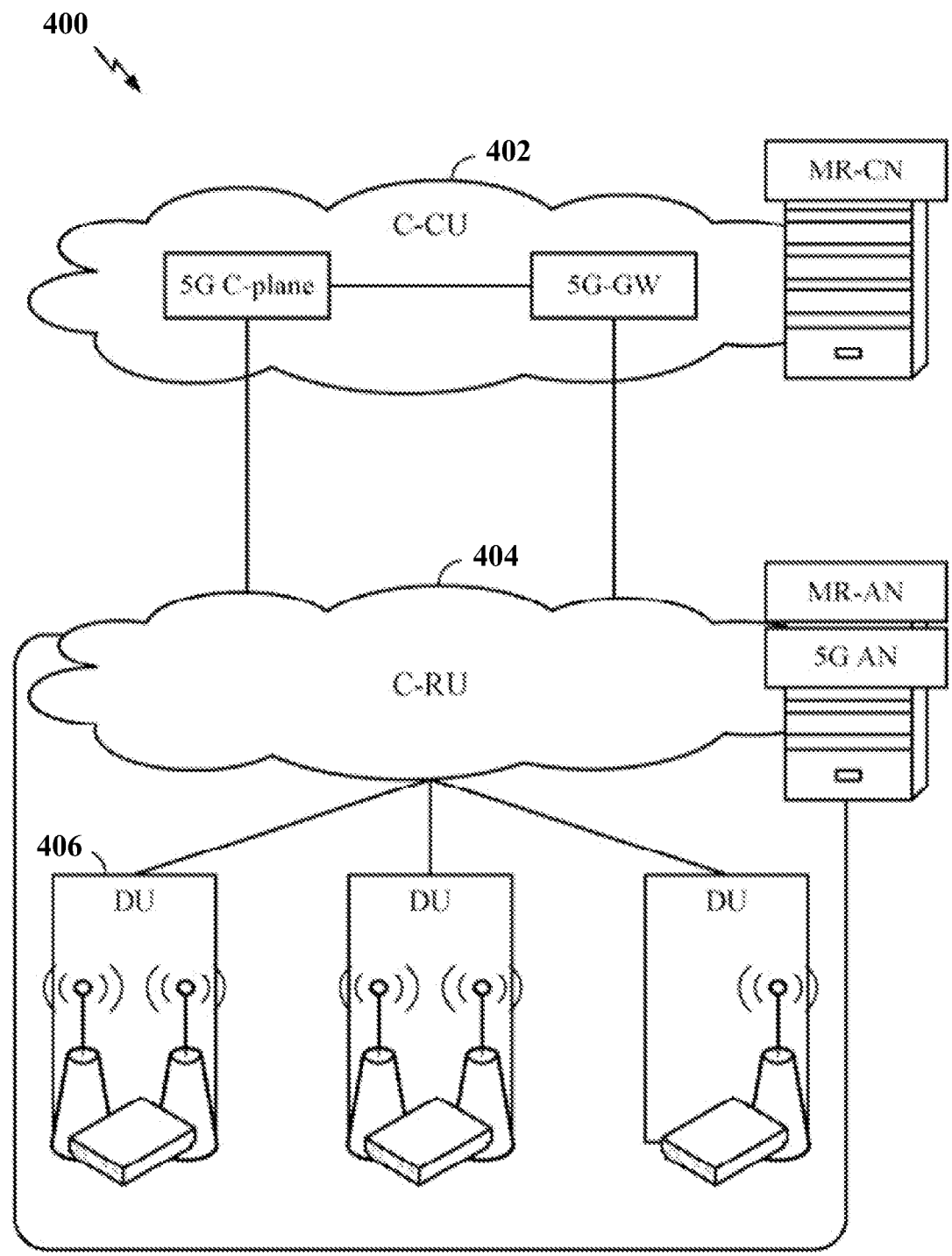
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
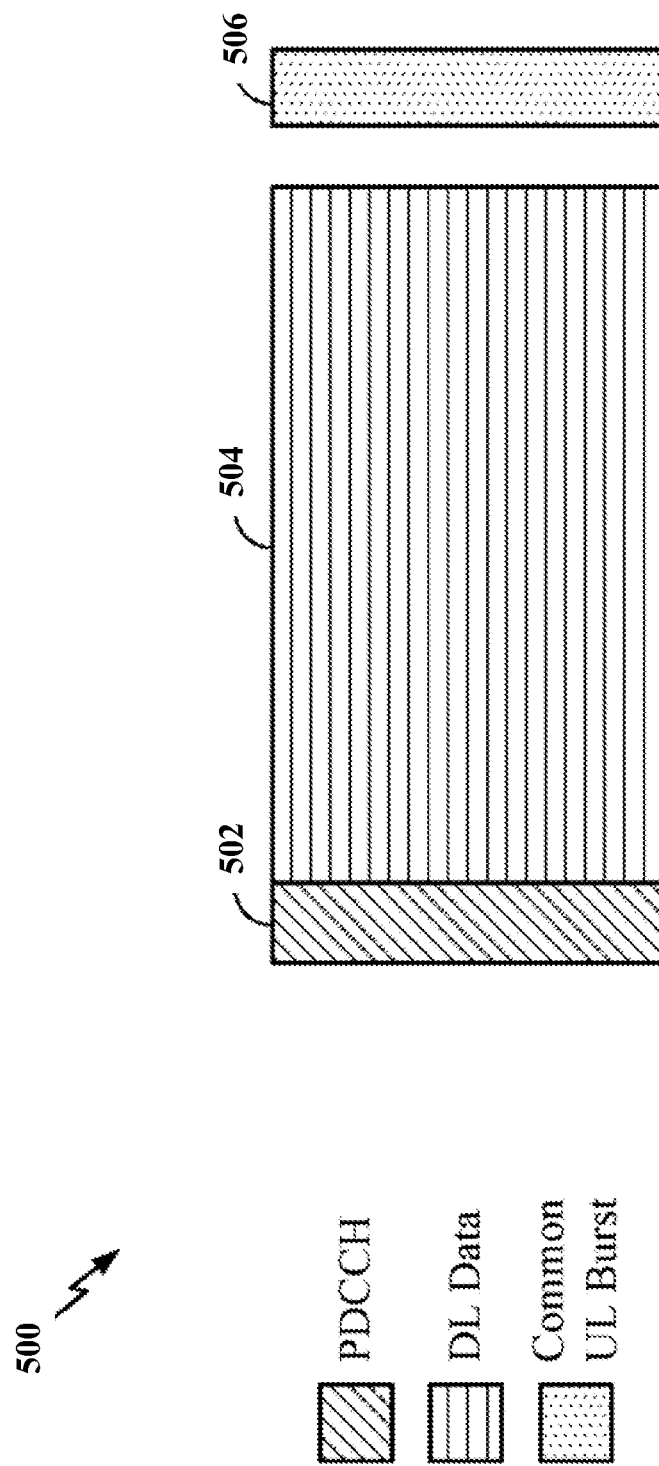
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
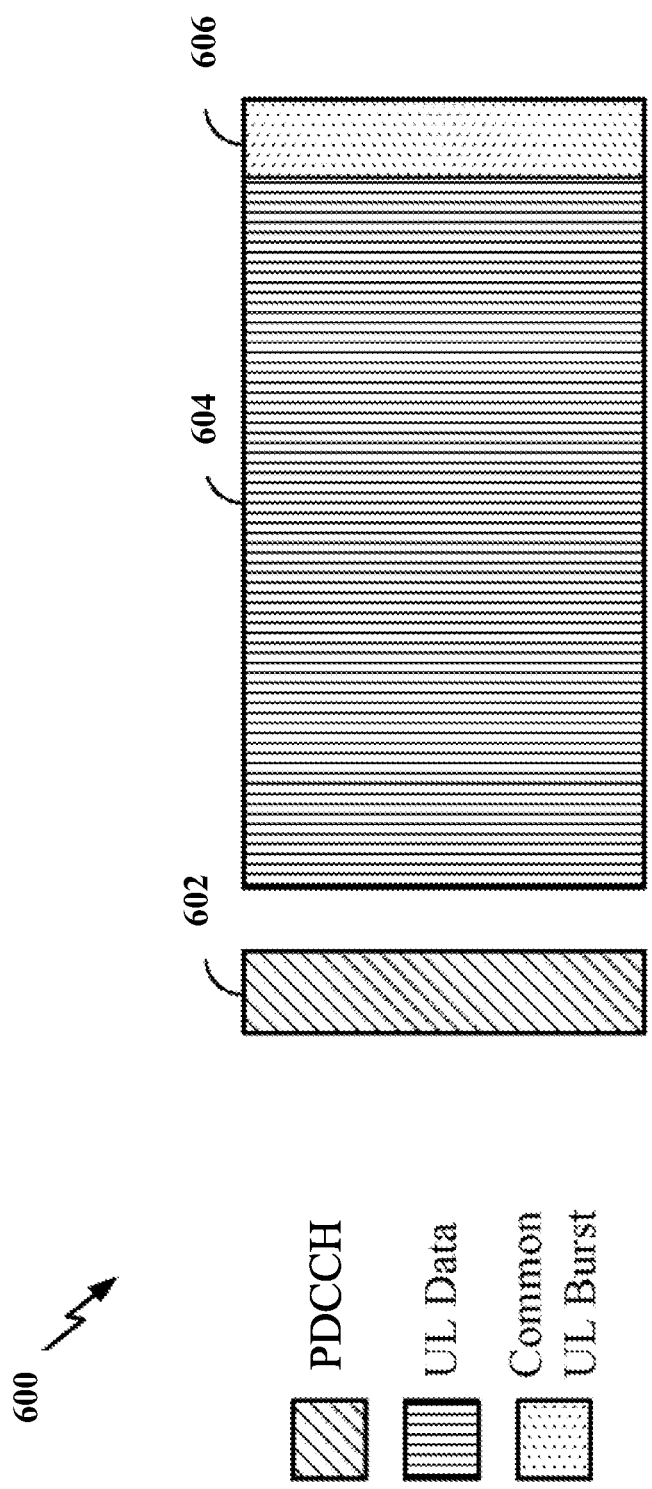
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
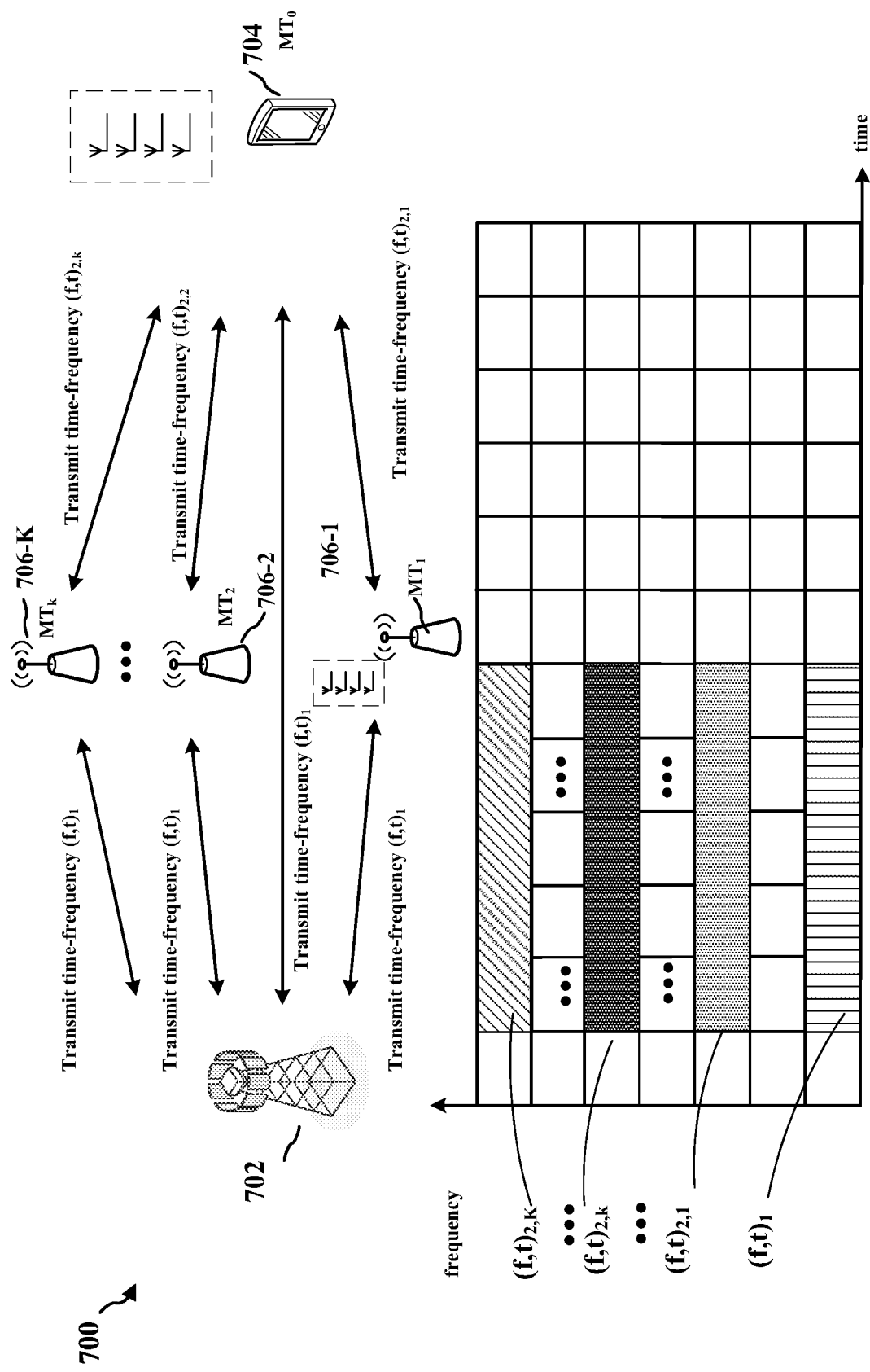
FIG. 7 is a diagram illustrating distributed MIMO transmission.

FIG. 7 is a diagram 700 illustrating distributed MIMO transmission. The present disclosure shows that multiple distributed low-rank mobile terminals (MTs) or wireless devices can form a high-rank MIMO transmitter/receiver. A base station 702 and a UE 704 communicate with each other via one or more repeaters. The repeaters may be wireless devices such as mobile phones, fixed customer premise equipment (CPE), and wireless routers. In this example, there are K repeaters 706-1, 706-2, . . . , 706-K (K is an integer and K≥1). The UE 704 and one or more of the the K repeaters 706-1, 706-2, . . . , 706-K may be connected together to form a high-rank MIMO transmitter/receiver network to expand the channel rank.

As described infra, a repeater receives RF signals on a first frequency band, shifts the RF carrier of the RF signals to a second frequency band, and then transmits the shifted RF signals on the second frequency band. Each frequency band is an interval in frequency domain. In particular, the repeater may be a frequency translating repeater. The repeater may also be a time delaying repeater, which receive RF signals and then re-transmit the received RF signals after some time delay. Further, the repeater may receive RF signals in a first time-frequency resource, translate the received RF signals to a second time-frequency resource, and then transmit the translated RF signals. In particular, the first time-frequency resource may be orthogonal with the second time-frequency resource.

This disclosure uses (f, t) to denote the time-frequency resources: $(f, t)_1$ denotes the time-frequency resource used by the base station for transmitting and receiving RF signals. $(f, t)_{2,k}$ denotes the resources used by a particular repeater $MT_k$ (k is an integer and 1≤k≤K) to receive RF signals. As such, $(f, t)_{2,1}$ indicates the resources that may be used by the UE 704 to transmit RF signals to the repeater 706-1 (i.e., $MT_1$); $(f, t)_{2,2}$ indicates the resources that may be used by the UE 704 to transmit signals to the repeater 708 (i.e., $MT_2$), and so on. In certain configurations, $(f, t)_1$, $(f, t)_{2,1}$, $(f, t)_{2,2}$, . . . and $(f, t)_{2,K}$ are orthogonal. In particular, they do not overlap in frequency domain. In certain configurations, $(f, t)_1$ may be the same as one $(f, t)_{2,k}$ (k∈1, . . . K), while the rest are orthogonal to each other. Further, $(f, t)_1$ and $(f, t)_{2,k}$ (1≤k≤K) can be non-overlapped component carriers, non-overlapped bandwidth parts (BWPs), non-overlapped frequency bands, or non-overlapped collections within the same component carrier.

The UE 704 and the repeaters 706-1, . . . , 706-K can be considered as an aggregated MT. Each of the UE 704 and the repeaters 706-1, . . . , 706-K can be considered as a component MT of the aggregated MT.

In the downlink direction, the base station 702 can transmit signals to the UE 704 and the repeaters 706-1, . . . , 706-K at the time-frequency resource $(f, t)_1$. The repeaters 706-1, . . . , 706-K transmit signals to the UE 704 at the $(f, t)_{2,1}$ . . . $(f, t)_{2,k}$, respectively.

The base station 702 utilizes a CSI framework that can support configuring multiple CSI reports for component MTs. In order to configure multiple reports for the UE aggregation architecture efficiently, the base station 702 needs to obtain sufficient feedback from the UE 704 for adjusting CSI report configurations. The feedback may include measurement reports, indications of a capability of each component MT, or an indication of a capability of the aggregated MT. The feedback may help the base station 702 determine how to adjust CSI report configurations.

In this example, the base station 702 may initialize an initial codebook with the UE 704 based on an initial capability report or feedback received from the UE 704. The initial capability report or feedback may indicate the effective or virtual antenna ports of the aggregated MT or the maximal rank supported by the aggregated MT as well as the total number of component MTs constituting the aggregated MT.

Then, the base station 702 configures, an initial set of CSI-RSs (e.g., coarse reference signals) for the UE 704 to measure. The base station 702 transmits an initial set of CSI-RSs to the UE 704. Based on the measurements, the UE 704 can suggest codebook parameters to the base station 702 in an initial report. Examples of suggested codebook parameters include the codebook type, number of RS ports, and parameters adjustable in a pre-defined codebook structure.

Regarding the codebook type, the UE 704 may indicate, in the initial report, a uniform linear array (ULA) codebook, a non-ULA based codebook such as a Householder matrix based precoder, or a coherent joint transmission (CJT) codebook. The adjustable parameters in the initial report may, for example, include the co-phasing parameter for co-phasing among antenna panels.

The base station 702 can then configure updated codebook and updated CSI reports for the UE 704 in order to acquire finer CSI based on the initial report. Finally, the UE 704 provides finer CSI reports according to the new configurations.

As described supra, the UE 704 may suggest the base station 702 using a CJT codebook. In general, a precoder matrix W for a transmitter across $N_3$ subbands utilized by the transmitter can be can be represented as:

$$W = W_1 \cdot W_2 \cdot W_f^H$$

W contains $N_3$ precoder vectors corresponding to the $N_3$ subbands. $W_1$ is a wideband precoder and contains 2 L vectors corresponding to 2 L basis beams. L is the number of basis beams per polarization. $W_f^H$ contains frequency domain (FD) bases and maps the $N_3$ subbands to M delay domains. $W_2$ is a 2 L×M matrix.

The CJT codebook can be reused to support the communication between single base station and an aggregated MT consisting of multiple component MTs, although it was originally designed for joint transmission from multiple transmission points. In this example, the base station 702 may use N sets of antennas to transmit to N component MTs selected from the UE 704 and the repeaters 706-1, . . . , 706-K. The precoder matrix W can be represented as $$W = \begin{bmatrix} W_{sub,1} \\ \vdots \\ W_{sub,N} \end{bmatrix}.$$

$W_{sub,i}$ is the precoder sub-matrix used by the $i^{th}$ set of antennas to transmit signals to the $i^{th}$ component MT of the N component MTs.

The CJT codebook has two modes with respect to the FD bases. In mode 1: each precoder matrix $W_{sub,i}$ (i=1, . . . , N) includes a $W_{f,i}$ specific for that precoder matrix. Accordingly, the precoder matrix W can be represented $$W = \begin{bmatrix} W_{sub,1} \\ \vdots \\ W_{sub,N} \end{bmatrix} = \begin{bmatrix} W_{1,1} \cdot \tilde{W}_{2,1} \cdot W_{f,1}^H \\ \vdots \\ W_{1,N} \cdot \tilde{W}_{2,N} \cdot W_{f,N}^H \end{bmatrix}.$$

In mode 2, all precoder matrix $W_{sub,i}$ (i=1, . . . , N) includes a common $W_f$. Accordingly, the the precoder matrix W can be represented $$W = \begin{bmatrix} W_{sub,1} \\ \vdots \\ W_{sub,N} \end{bmatrix} = \begin{bmatrix} W_{1,1} \cdot \tilde{W}_{2,1} \cdot W_f^H \\ \vdots \\ W_{1,N} \cdot \tilde{W}_{2,N} \cdot W_f^H \end{bmatrix}.$$

The matrix $W_{1,i}$, i=1, . . . , N contains spatial basis vectors associated with the $i^{th}$ set of antennas of the base station 702 for transmitting signals to the $i^{th}$ component MT. The base station 702 can assign different values to $W_{1,i}$ when i has different values.

In this example, the UE 704 and the repeaters 706-1, 706-2, 706-3 form a aggregated MT. Thus, N=4. As described supra, the UE 704 may send an initial report to the base station 702, indicating the number of component MTs, the number of antennas being used at each component MT, the CJT codebook type, and parameters of codebook components (e.g., $W_1$, $W_2$, and/or $W_f$) for each $W_{sub,i}$.

Accordingly, the base station 702 determines a precoder matrix W in mode 1 or mode 2 based on the suggestions in the initial report. When in mode 1, the precoder matrix W is as follows:

$$W = \begin{bmatrix} W_{sub,1} \\ W_{sub,2} \\ W_{sub,3} \\ W_{sub,4} \end{bmatrix} = \begin{bmatrix} W_{1,1} \cdot \tilde{W}_{2,1} \cdot W_{f,1}^H \\ W_{1,2} \cdot \tilde{W}_{2,2} \cdot W_{f,2}^H \\ W_{1,3} \cdot \tilde{W}_{2,3} \cdot W_{f,3}^H \\ W_{1,4} \cdot \tilde{W}_{2,4} \cdot W_{f,4}^H \end{bmatrix}$$

When in mode 2, the precoder matrix W is as follows:

$$W = \begin{bmatrix} W_{sub,1} \\ W_{sub,2} \\ W_{sub,3} \\ W_{sub,4} \end{bmatrix} = \begin{bmatrix} W_{1,1} \cdot \tilde{W}_{2,1} \cdot W_f^H \\ W_{1,2} \cdot \tilde{W}_{2,2} \cdot W_f^H \\ W_{1,3} \cdot \tilde{W}_{2,3} \cdot W_f^H \\ W_{1,4} \cdot \tilde{W}_{2,4} \cdot W_f^H \end{bmatrix}$$

As such, the base station 702 can determine four different sets of spatial basis vectors (i.e., $W_{1,1}$, $W_{1,2}$, $W_{1,3}$ and $W_{1,4}$) for forming 4 precoder sub-matrices. Accordingly, the base station 702 may form transmission beams by precoding along four different directions to the UE 704 and the repeaters 706-1, 706-2, 706-3, respectively.

Subsequently, the number of repeaters in the aggregated MT may change. The UE 704 may indicate to the base station 702 the change. Accordingly, the base station may update the CJT codebook based on the new value of N.

The base station 702 may not only rely on the number of component MTs in the aggregated MT to decide the value of N. A value of N that is less than the total number of component MTs may sufficient, especially in cases where multiple component MTs are located close to each other. The UE 704 may directly suggest, to the base station 702, the optimal codebook parameters such as the value of N or the parameters used to form each sub-matrix $W_{sub,i}$. For example, the UE 704 may report matrix dimension for each $W_{sub,i}$.

On the downlink, after receiving the initial report and/or feedback from the UE 704, the base station 702 may update configurations for measurement resources and configurations for CSI reports to acquire finer CSI. Those updated may be sent to the UE 704 via MAC CE. In this example, the UE 704 is equipped with 4 antennas for simultaneous reception on the time-frequency resources $(f, t)_1$ and the time-frequency resources $(f, t)_{2,1}$. The repeater 706-1 is equipment with 4 antennas for reception on the time-frequency resources $(f, t)_1$ and 4 antennas for transmission on the time-frequency resources $(f, t)_{2,1}$. As described supra, the base station 702 may transmit signals directly to the UE 704 on the time-frequency resources $(f, t)_1$. Further, the base station 702 may also transmit signals to the repeater 706-1 on the time-frequency resources $(f, t)_1$. The repeater 706-1 receives the signals on the time-frequency resources $(f, t)_1$, and forwards the signals to the UE 704 on the time-frequency resources $(f, t)_{2,1}$.

After the UE 704 and the repeater 706-1 forms an aggregated MT, the total number of reception antennas over all virtual panels of the aggregated MT is 8. Although the aggregation of the UE 704 and the repeater 706-1 can at most support 8 layers, it is not necessary to always configure 8 (pre-coded) CSI-RS ports for CSI acquisition because it depends on the channel characteristics of all link between all transmission-reception pairs. The base station 702 may configure 6 precoded CSI-RS ports if channel rank of the end-to-end channel between base station 702 and the aggregated UE is 6. This may happen if the channel between the UE 704 and the repeater 706-1 is line-of-sight or ill-conditioned. The base station 702 needs assistant information from UE side to know how many CSI-RS ports are sufficient (in this example, the number is 6). Also, the repeater 706 may disjoin later and then it falls back to a single normal UE case that may at most support 4 layers.

The UE 704 can also feedback information to suggest the number of RS ports and port selection. In this example, the base station 702 may configure 8 CSI-RS ports for CSI acquisition initially; the 8 CSI-RS ports may be associated with a CSI report corresponding to the aggregated MT formed by the UE 704 and the repeaters 706-1 or be associated with two CSI reports corresponding to the direct link from the base station 702 to the UE 704 and the indirect link from the base station 702 to the UE 704 via the repeater 706-1, respectively. In the CSI report(s), the UE 704 may suggest which ports are with better receiving quality so that the base station 702 may not need to configure/use all 8 ports in order to reduce overhead of CSI-RS. In contrast to conventional CSI report including CRI/RI/PMI/CQI, a report may suggest a group ports down-selected from the measured ports. For example, after measuring the 8 ports including 4 ports corresponding to the direct link and 4 ports corresponding to the indirect link passing through the repeater 706-1 respectively, the UE 704 may suggest to use only 6 ports out of the measured 8 ports. This is equivalent to suggest a precoder containing zero for its precoding coefficients, e.g., $[c1, c2, c3, c4, c5, c6, 0, 0]$ or suggest changing resource configurations of a CSI report to adopt 6 ports instead of 8 ports.

Because the components of the aggregated UE may vary, some update for report configuration may updated accordingly, e.g., maximum value for rank reporting. MAC CE may be sufficient for such an update.

Similar to the DL framework, for UL framework, the base station 802 may initialize a set of reference signals for the UE 704's transmission based on a capability report for aggregated devices from the UE 704 which includes a maximum number of supporting spatial layers. The UE 704 then transmits reference signals to the base station 802. The base statin 702 measures reference signals transmitted by the UE 704. Based on the measurements, the base station 802 can make new configuration for sounding/reports to acquire finer CSI. The base station 802 preforms sounding with finer granularity according the new configuration. The base station may change the codebook type, the number of RS ports or some parameters adjustable in a pre-defined codebook structure.

In the uplink direction, in this example, the base station 702 may initialize an initial codebook with the UE 704 based on an initial capability report or feedback received from the UE 704. The initial capability report or feedback may indicate the effective or virtual antenna ports of the aggregated MT or the rank supported by the aggregated MT as well as the number of component MTs constituting the aggregated MT. The base station 702 initially configures the UE 704 to transmit sounding reference signals (SRSs) to the base station 702 for coarse measurement.

Accordingly, the UE 704 transmits SRSs to the base station 702. The base station 702 conducts coarse measurement of the SRSs. Based on the measurements, the base station 702 can configure new SRS resources and new codebook parameters for the UE. The base station 702 may configure a new codebook for the UE 704 to use in uplink precoding. The codebook may be a uniform linear array (ULA) codebook, a non-ULA based codebook such as a Householder matrix based precoder, or a coherent joint transmission (CJT) codebook. The codebook parameters may, for example, include the co-phasing parameter for co-phasing among antenna panels. Subsequently, the UE 704 and the base station 702 can conduct uplink sounding with finder granularity. Other techniques described supra with respect to the downlink direction may be equally applied in uplink direction.

In another example, the UE 704 can feedback information to suggest codebook parameters (such as a codebook type) for uplink data transmission. The codebook type may be a uniform linear array (ULA) codebook, a non-ULA based codebook such as a Householder matrix based precoder, or a coherent joint transmission (CJT) codebook. The feedback information may be up to UE 704's implementation, or additionally with the aid of downlink reference signals and channel reciprocity. For example, the base station 702 may configure an initial set of downlink reference signals to the UE 704 for downlink channel measurement. Based on channel reciprocity, the UE 704 may approximate uplink channel between the aggregated MT to the base station 702 based on the channel measurement. Then, based on the measurement the UE 704 can derive the feedback information.

In this example, as described supra, the UE 704 may transmit signals to the base station 702 directly on the time-frequency resources $(f, t)_1$. Further, the UE 704 may also transmit signals to the repeater 706-1 on the time-frequency resources $(f, t)_{2,1}$. The repeater 706-1 receives the signals on the time-frequency resources $(f, t)_{2,1}$, and forwards the signals to the base station 702 on the time-frequency resources $(f, t)_1$.

The base station 702 may initially allocate 8 ports of SRS resource for UL channel sounding from the UE 704; the UE 704 transmits part of the 8 ports on the time-frequency resources $(f, t)_1$ and the rest of ports on the time-frequency resources $(f, t)_{2,1}$. Based on measurement on the SRS resource at base station side, the base station 702 may adjust the number of SRS ports to, for example, 6 if the base station 702 finds that signal quality corresponding to part of ports are too weak. Then later on the UE 704 transmits SRSs according to the updated SRS resource configuration.

Figure 8:
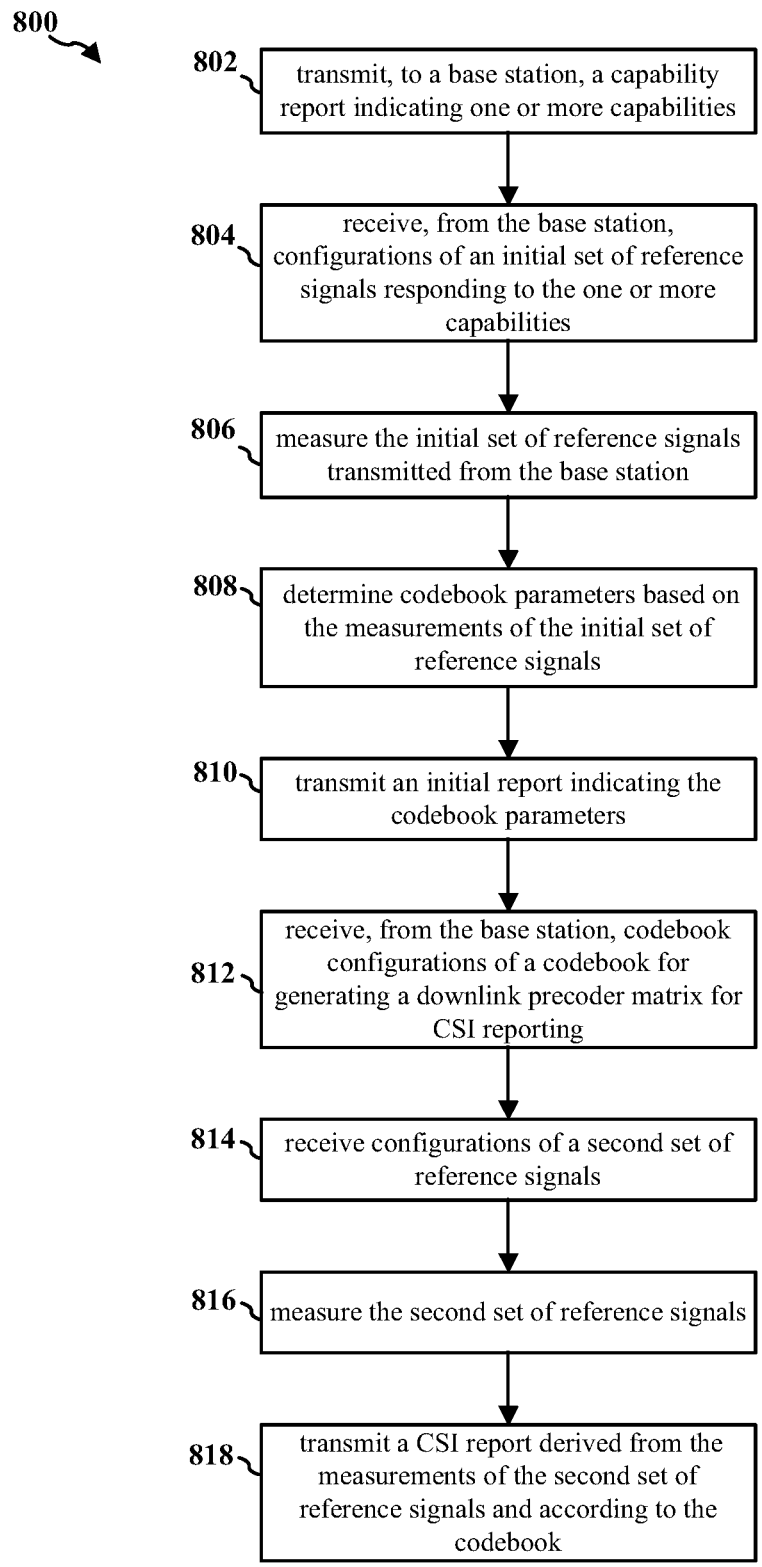
FIG. 8 is a flow chart 800 of a method (process) for configuring codebooks in a downlink direction for distributed MIMO transmitters/receivers.

FIG. 8 is a flow chart 800 of a method (process) for configuring codebooks in a downlink direction for distributed MIMO transmitters/receivers. The method may be performed by a UE (e.g., the UE 704). In operation 802, the UE transmits, to a base station, a capability report indicating one or more capabilities of an aggregated mobile terminal (MT) formed by the UE and one or more devices each being a component device. In certain configurations, the one or more capabilities include at least one of a first number of antenna ports supported by the aggregated MT and the number of component MTs constituting the aggregated MT.

In operation 804, the UE receives, from the base station, configurations of an initial set of reference signals, which may be responding to the one or more capabilities. In operation 806, the UE measures the initial set of reference signals transmitted from the base station.

In operation 808, the UE determines codebook parameters based on the measurements of the initial set of reference signals. The codebook parameters include at least one of: a codebook type, one or more adjustable parameters associated with the codebook type, and a second number of antenna ports preferred by the aggregated MT.

In certain configurations, the one or more adjustable parameters include a co-phasing parameter for co-phasing among a plurality of antenna panels associated with the aggregated MT. In certain configurations, the codebook parameters indicate a downlink precoder matrix for CSI report containing a number of precoder sub-matrices corresponding to the number of component MTs. A first precoder sub-matrix of the number of precoder sub-matrices utilizes a first set of spatial bases and a second precoder sub-matrix of the number of precoder sub-matrices utilizes a second set of spatial bases, wherein the first set of spatial bases are different from the second set of spatial bases.

In operation 810, the UE transmits an initial report indicating the codebook parameters. In operation 812, the UE receives, from the base station, codebook configurations of a codebook for generating a downlink precoder matrix for CSI reporting. In operation 814, the UE receives configurations of a second set of reference signals determined based on the codebook and the second number of antenna ports. In operation 816, the UE measures the second set of reference signals. In operation 818, the UE transmits a CSI report derived from the measurements of the second set of reference signals and according to the codebook.

Figure 9:
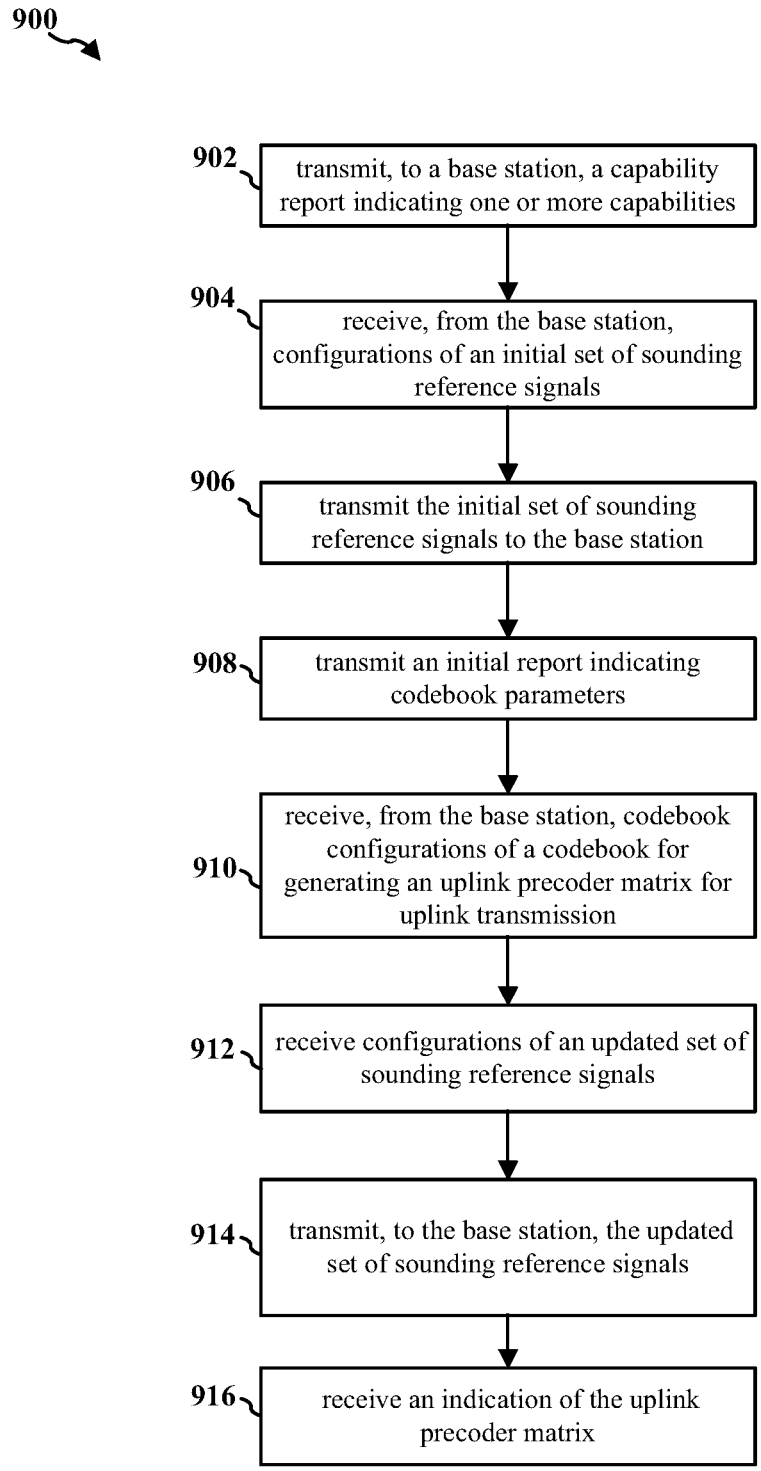
FIG. 9 is a flow chart 900 of a method (process) for configuring codebooks in an uplink direction for distributed MIMO transmitters/receivers.

FIG. 9 is a flow chart 900 of a method (process) for configuring codebooks in an uplink direction for distributed MIMO transmitters/receivers. The method may be performed by a UE (e.g., the UE 704). In operation 902, the UE transmits, to a base station, a capability report indicating one or more capabilities of an aggregated mobile terminal (MT) formed by the UE and one or more devices each being a component device. The one or more capabilities include at least one of a first number of transmission antenna ports supported by the aggregated MT in uplink transmission and the number of component MTs constituting the aggregated MT.

In operation 904, the UE receives, from the base station, configurations of an initial set of sounding reference signals, which may be responding to the one or more capabilities. In certain configurations, the UE also received configurations of an initial set of downlink reference signals to be measured by the UE in order to derive an initial report. In operation 906, the UE transmits the initial set of sounding reference signals to the base station. In operation 908, the UE transmits the initial report indicating codebook parameters. The codebook parameters include at least one of: a codebook type, one or more adjustable parameters related to the codebook type, and a second number of antenna ports preferred by the aggregated MT in uplink transmission.

In operation 910, the UE receives, from the base station, codebook configurations of a codebook for generating an uplink precoder matrix for uplink transmission. In operation 912, the UE receives configurations of an updated set of sounding reference signals configured based on the codebook and the second number of antenna ports. In operation 914, the UE transmits, to the base station, the updated set of sounding reference signals.

In operation 916, the UE receives an indication of the uplink precoder matrix. The indication for the uplink precoder matrix is according to the codebook and responding to the transmission of the updated set of sounding reference signals.

In certain configurations, the uplink precoder matrix contains a number of precoder sub-matrices corresponding to the number of component MTs. A first precoder sub-matrix of the number of precoder sub-matrices utilizes a first set of spatial bases and a second precoder sub-matrix of the number of precoder sub-matrices utilizes a second set of spatial bases, wherein the first set of spatial bases are different from the second set of spatial bases. Each precoder sub-matrix is applied to signals transmitted from the UE to the base station or to a respective component MT of the number of component MTs.

Furthermore, a base station may perform the below operations to configure codebooks for distributed MIMO transmitters/receivers. The base station receives a capability report from a user equipment (UE). The capability report indicates one or more capabilities of an aggregated mobile terminal (MT) formed by the UE and one or more repeaters. Each repeater is a component MT. The base station configures an initial set of reference signals for the UE based on the one or more capabilities. The base station transmits the initial set of reference signals to the UE. The base station receives an initial report from the UE. The initial report indicates codebook parameters. The base station determines a codebook. The codebook is either initiated or updated according to the codebook parameters. The base station configures the codebook for the UE.

In one aspect, the codebook is for generating a downlink precoder matrix for CSI reporting. The one or more capabilities include at least one of a first number of antenna ports supported by the aggregated MT and a number of component MTs constituting the aggregated MT. The codebook parameters include at least one of: a codebook type, one or more adjustable parameters associated with the codebook type, and a second number of antenna ports preferred by the aggregated MT. The one or more adjustable parameters include a co-phasing parameter for co-phasing among a plurality of antenna panels associated with the aggregated MT.

The base station configures a second set of reference signals based on the codebook and the second number of antenna ports. The base station transmits the second set of reference signals to the UE. The base station receives a CSI report according to the codebook from the UE.

The codebook parameters indicate a downlink precoder matrix for CSI report containing a number of precoder sub-matrices corresponding to the number of component MTs. A first precoder sub-matrix of the number of precoder sub-matrices utilizes a first set of spatial bases. A second precoder sub-matrix of the number of precoder sub-matrices utilizes a second set of spatial bases. The first set of spatial bases are different from the second set of spatial bases.

In another aspect, the codebook is for the base station to indicate an uplink precoder matrix for uplink transmission from the UE. The one or more capabilities include at least one of a first number of transmission antenna ports supported by the aggregated MT in uplink transmission and a number of component MTs constituting the aggregated MT.

The base station configures the initial set of reference signals by configuring the UE to transmit sounding reference signals to the base station. The codebook parameters include at least one of: a codebook type, one or more adjustable parameters associated with the codebook type, and a second number of antenna ports preferred by the aggregated MT in uplink transmission.

The base station determines the uplink precoder matrix containing a number of precoder sub-matrices corresponding to the number of component MTs. A first precoder sub-matrix of the number of precoder sub-matrices utilizes a first set of spatial bases. A second precoder sub-matrix of the number of precoder sub-matrices utilizes a second set of spatial bases. The first set of spatial bases are different from the second set of spatial bases.

The base station configures an updated set of sounding reference signals based on the codebook and the second number of antenna ports. The base station measures the updated set of sounding reference signals from the UE. The base station generates an indication for the uplink precoder matrix based on the measurements of the updated set of sounding reference signals and the codebook. Each precoder sub-matrix is applied to signals transmitted to the base station or a respective component MT of the number of component MTs.

Figure 10:
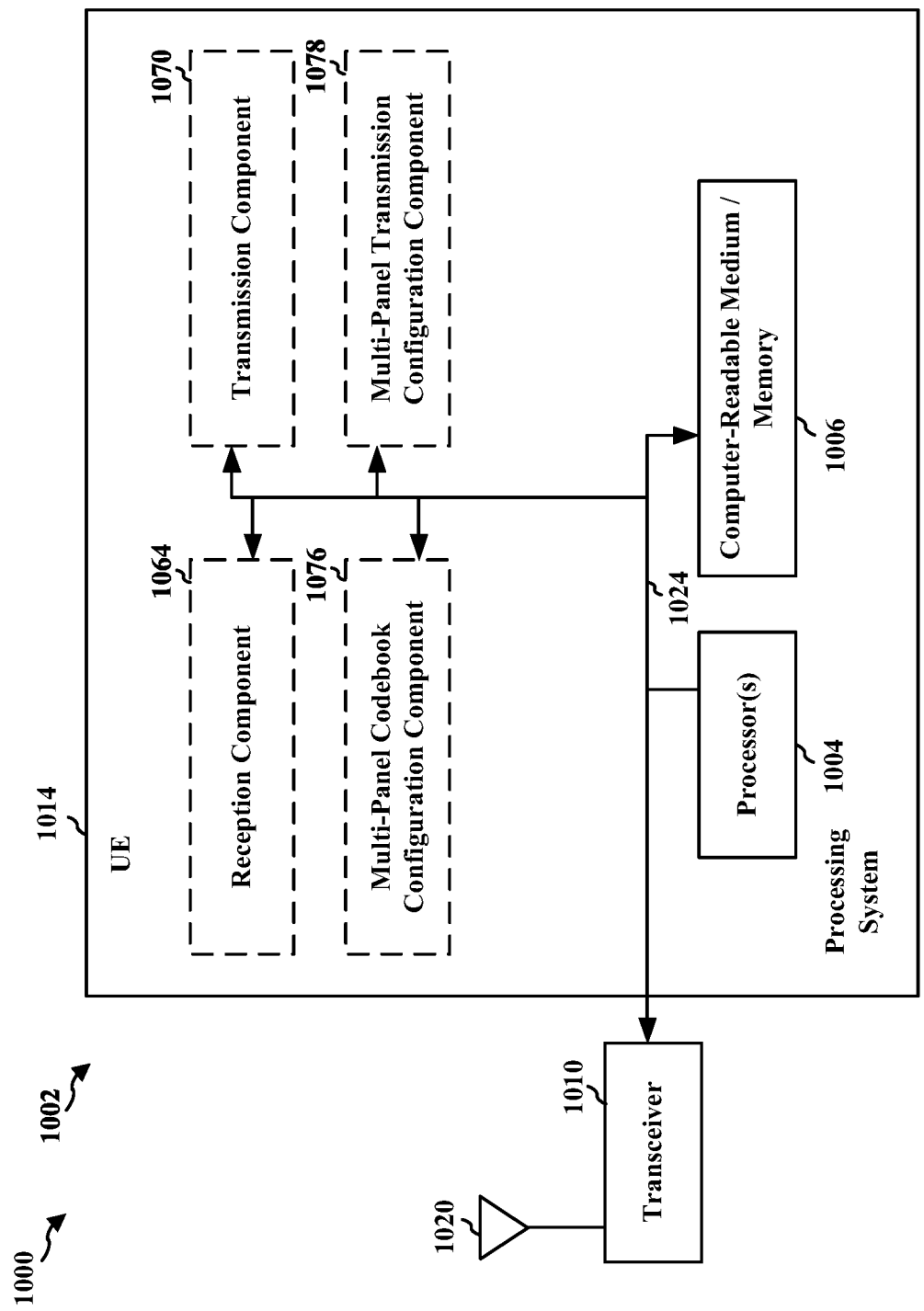
FIG. 10 is a diagram illustrating an example of a hardware implementation for an apparatus employing a processing system.

FIG. 10 is a diagram 1000 illustrating an example of a hardware implementation for an apparatus 1002 employing a processing system 1014. The apparatus 1002 may be a UE (e.g., the UE 704). The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, a reception component 1064, a transmission component 1070, a multi-panel codebook configuration component 1076, a multi-panel transmission configuration component 1078, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 254. The transceiver 1010 is coupled to one or more antennas 1020, which may be the communication antennas 252.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1064. In addition, the transceiver 1010 receives information from the processing system 1014, specifically the transmission component 1070, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 1064, the transmission component 1070, the multi-panel codebook configuration component 1076, and the multi-panel transmission configuration component 1078. The components may be software components running in the one or more processors 1004, resident/stored in the computer readable medium/memory 1006, one or more hardware components coupled to the one or more processors 1004, or some combination thereof. The processing system 1014 may be a component of the UE 250 and may include the memory 260 and/or at least one of the TX processor 268, the RX processor 256, and the communication processor 259.

In one configuration, the apparatus 1002 for wireless communication includes means for performing each of the operations of FIGS. 8-9. The aforementioned means may be one or more of the aforementioned components of the apparatus 1002 and/or the processing system 1014 of the apparatus 1002 configured to perform the functions recited by the aforementioned means.

As described supra, the processing system 1014 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   transmitting, to a base station, a capability report indicating one or more capabilities of an aggregated mobile terminal (MT) formed by the UE and one or more devices each being a component device;
   receiving, from the base station, configurations of an initial set of reference signals;
   transmitting an initial report indicating codebook parameters; and
   receiving, from the base station, codebook configurations of a codebook for generating a downlink precoder matrix for channel state information (CSI) reporting or for generating an uplink precoder matrix for uplink transmission.

2. The method of claim 1, wherein the codebook is for generating a downlink precoder matrix for CSI reporting, the method further comprising:
   measuring the initial set of reference signals transmitted from the base station.

3. The method of claim 2, wherein the one or more capabilities include at least one of a first number of antenna ports supported by the aggregated MT and the number of component MTs constituting the aggregated MT.

4. The method of claim 2, further comprising:
   determining the codebook parameters based on the measurements of the initial set of reference signals, wherein the codebook parameters include at least one of: a codebook type, one or more adjustable parameters associated with the codebook type, and a second number of antenna ports preferred by the aggregated MT.

5. The method of claim 4, wherein the one or more adjustable parameters include a co-phasing parameter for co-phasing among a plurality of antenna panels associated with the aggregated MT.

6. The method of claim 4, further comprising:
   receiving configurations of a second set of reference signals determined based on the codebook and the second number of antenna ports;
   measuring the second set of reference signals; and
   transmitting a CSI report derived from the measurements of the second set of reference signals and according to the codebook.

7. The method of claim 2, wherein the codebook parameters indicate a downlink precoder matrix for CSI report containing a number of precoder sub-matrices corresponding to the number of component MTs.

8. The method of claim 7, wherein a first precoder sub-matrix of the number of precoder sub-matrices utilizes a first set of spatial bases and a second precoder sub-matrix of the number of precoder sub-matrices utilizes a second set of spatial bases, wherein the first set of spatial bases are different from the second set of spatial bases.

9. The method of claim 1, wherein the codebook is for the UE to generate an uplink precoder matrix for uplink transmission.

10. The method of claim 9, wherein the one or more capabilities include at least one of a first number of transmission antenna ports supported by the aggregated MT in uplink transmission and the number of component MTs constituting the aggregated MT.

11. The method of claim 9, wherein the initial set of reference signals are sounding reference signals, the method further comprises transmitting the sounding reference signals to the base station.

12. The method of claim 9, wherein the codebook parameters include at least one of: a codebook type, one or more adjustable parameters related to the codebook type, and a second number of antenna ports preferred by the aggregated MT in uplink transmission.

13. The method of claim 9, wherein the initial set of reference signals are downlink reference signals to be measured by the UE in order to derive the initial report.

14. The method of claim 9, further comprising:
   receiving an indication of the uplink precoder matrix containing a number of precoder sub-matrices corresponding to the number of component MTs.

15. The method of claim 14, wherein a first precoder sub-matrix of the number of precoder sub-matrices utilizes a first set of spatial bases and a second precoder sub-matrix of the number of precoder sub-matrices utilizes a second set of spatial bases, wherein the first set of spatial bases are different from the second set of spatial bases.

16. The method of claim 14, further comprising:
   receiving configurations of an updated set of sounding reference signals configured based on the codebook and the second number of antenna ports;
   transmitting, to the base station, the updated set of sounding reference signals, wherein the indication for the uplink precoder matrix is according to the codebook and responding to the transmission of the updated set of sounding reference signals.

17. The method of claim 9, wherein each precoder sub-matrix is applied to signals transmitted from the UE to the base station or to a respective component MT of the number of component MTs.

18. A method of wireless communication of a base station, comprising:
   receiving, from a user equipment (UE), a capability report indicating one or more capabilities of an aggregated mobile terminal (MT) formed by the UE and one or more repeaters each being a component MT;
   configuring, for the UE and based on the one or more capabilities, an initial set of reference signals;
   transmitting the initial set of reference signals to the UE;
   receiving, from the UE, an initial report indicating codebook parameters;
   determining a codebook, which is either initiated or updated according to the codebook parameters, for generating a downlink precoder matrix for channel state information (CSI) reporting; and
   configuring the codebook for the UE.

19. The method of claim 18, wherein the codebook parameters include at least one of: a codebook type, one or more adjustable parameters associated with the codebook type, and a second number of antenna ports preferred by the aggregated MT.

20. The method of claim 18, wherein the codebook parameters indicate a downlink precoder matrix for CSI report containing a number of precoder sub-matrices corresponding to the number of component MTs.

\* \* \* \* \*